United States Patent [19]

Wunderlich, Jr. et al.

[11] Patent Number: 4,594,205
[45] Date of Patent: Jun. 10, 1986

[54] METHOD FOR FORMING CONCRETE FLUSH FLOORS HAVING INTEGRAL TROUGHS

[75] Inventors: Max A. Wunderlich, Jr.; Stephen E. Kneifel, both of Columbus, Nebr.

[73] Assignee: Wunderlich Construction Inc., Columbus, Nebr.

[21] Appl. No.: 679,427

[22] Filed: Dec. 7, 1984

[51] Int. Cl.⁴ .................... E04B 1/16; B28B 7/16
[52] U.S. Cl. ........................ 264/31; 249/18; 249/142; 249/150; 249/177; 249/183; 264/35; 264/277; 264/313; 264/316; 264/333
[58] Field of Search ............ 264/31, 35, 333, 277, 264/313, 316; 249/11, 18, 142, 144, 150, 151, 175, 177, 183

[56] References Cited

U.S. PATENT DOCUMENTS

| | | | |
|---|---|---|---|
| 2,644,997 | 7/1953 | Billings | 249/183 X |
| 3,052,945 | 9/1962 | Cummings | 249/183 X |
| 3,082,504 | 3/1963 | Tatsch | 264/313 X |
| 3,589,664 | 6/1971 | Middlestadt | 249/150 X |
| 3,915,422 | 10/1975 | Nobbe | 249/142 X |
| 4,168,820 | 9/1979 | Nobbe | 249/142 |
| 4,374,078 | 2/1983 | Richardson | 264/35 |

*Primary Examiner*—Jan Silbaugh
*Attorney, Agent, or Firm*—Henderson & Sturm

[57] ABSTRACT

A method and apparatus for forming a concrete flush floor having at least one trough formed therein, the method making use of high chair units (14) that support a fiberglass mold (16) having a truncated teardrop-shaped cross section. The fiberglass mold (16) may be supported at an angle to provide a resulting sloping trough. A spacer (17) can be placed in the fiberglass mold (16) during the pouring process to urge the fiberglass mold (16) to assume a first shape. When the concrete has hardened, the spacer (17) can be forced to a second position that allows the fiberglass mold (16) to assume a second position, which second position allows the fiberglass mold (16) to be easily removed from the cast concrete.

5 Claims, 7 Drawing Figures

1

METHOD FOR FORMING CONCRETE FLUSH FLOORS HAVING INTEGRAL TROUGHS

TECHNICAL FIELD

This invention relates generally to flush floors, and more particularly to a method and apparatus for forming concrete flush floors having integral troughs formed therein for allowing accumulated deposits to be directed away by a flushing agent.

BACKGROUND ART

Flush floors of various kinds are well known in the prior art. Many such flush floors are utilized in animal confinement situations. In this setting, flush floors allow accumulated biologic waste materials to be easily removed from the surface of the floor by a flushing agent, and to be thereafter directed to an appropriate collection site.

Some flush floors are formed of poured concrete. Many attempts have been made to provide such a concrete flush floor with integrally formed troughs. These efforts have met with many difficulties.

To date, the success of such integral trough forming methods have been highly dependent upon the characteristics of each particular batch of concrete. This has necessitated the accurate use of slump readings and other tests to determine the particular characteristics of a particular load of concrete, and the adjustment of trough forming parameters accordingly. Even with appropriate attention to these details, however, an unacceptable risk exists that the resulting floor will be unsatisfactory. In this event, the floor must be removed and repoured.

There therefore exists a need for a method and apparatus for forming a poured concrete floor having integral troughs that is simple, reliable, inexpensive, eliminates special concrete needs and that yields a durable, efficient and otherwise well constructed floor.

DISCLOSURE OF THE INVENTION

These needs are met by provision of the present invention. The apparatus of this invention generally includes boundary forms and support stakes, reinforcement frame, high chairs, fiberglass molds, spacers and strap members.

The boundary forms and support stakes are typically comprised of wood and are otherwise as may be found in the prior art. Similarly, the reinforcement frame provides added support to the poured concrete in a manner well known in the prior art.

The high chairs are each comprised of a support member for contacting the ground and a mold fitting member affixed to the support member for supporting a fiberglass mold. In addition, the mold fitting member of the high chair further serves to urge the fiberglass mold towards a particular desired cross-sectional configuration.

Each fiberglass mold may be formed of a 3/16" (0.476 cm.) thick sheet that is smoothly contoured back upon itself to form a mold having a truncated teardrop-shape profile. Each fiberglass mold may be up to twenty-five feet (7.62 meters) in length, and typically have a six inch (15.24 cm.) height and three inch (7.62 cm.) width at its widest lateral dimension.

The spacers are comprised of thin wooden lathes that may be disposed within the fiberglass molds during the pouring and curing of the concrete.

Finally, the strap members may each be comprised of a simple metal strap, such as thirty gauge banding, that can be affixed to the spacers and to the boundary forms to aid in preventing vertical movement of the fiberglass molds during pouring and curing of the concrete.

The method of the present invention makes use of the above apparatus in the following way.

First, the intended site will be graded, and the boundary forms will be positioned and held in place through use of the support stakes. An appropriate foundation material, such as sand, may then be disposed within the boundary forms to an appropriate depth. Following this, the reinforcement frame may be disposed in accordance with well known prior art practice.

The high chairs may then be disposed by aligning groups of them co-linearly, with the support member of each high chair penetrating into and being supported by the ground. The respective height of each mold fitting member may then be adjusted, through use of a laser transit or other appropriate means, such that a desired slope in each line of high chairs can be achieved. This slope will coincide with the slope of the integral trough to be eventually formed in the concrete flush floor.

The spacers may then be disposed within an upper cavity of each fiberglass mold and affixed therein by driving staples or the like through the sidewalls of the fiberglass mold. The fiberglass molds may then be coated with an appropriate substance, such as form oil, and then disposed within the mold fitting members of the high chairs. As a result, a plurality of fiberglass molds are disposed substantially parallel to one another, and at a preselected slope.

The strap members may then be attached to the boundary forms and to the spacers through use of staples or the like. They may be positioned substantially parallel to one another at approximate eight foot (2.44 meters) intervals. The concrete can then be poured and the strapping removed so that the surface of the concrete can be finished.

Once the concrete has hardened, the spacers can be pushed down into a lower interior cavity of the fiberglass molds, and the fiberglass molds can thereafter be removed by simply sliding them out of the trough formed in the concrete.

BRIEF DESCRIPTION OF THE DRAWINGS

These attributes of the invention and others will become more clear upon a thorough review and study of the following description of the best mode for carrying out the invention, particularly when reviewed in conjunction with the drawings, wherein.

BEST MODE FOR CARRYING OUT THE INVENTION

Figure 1:
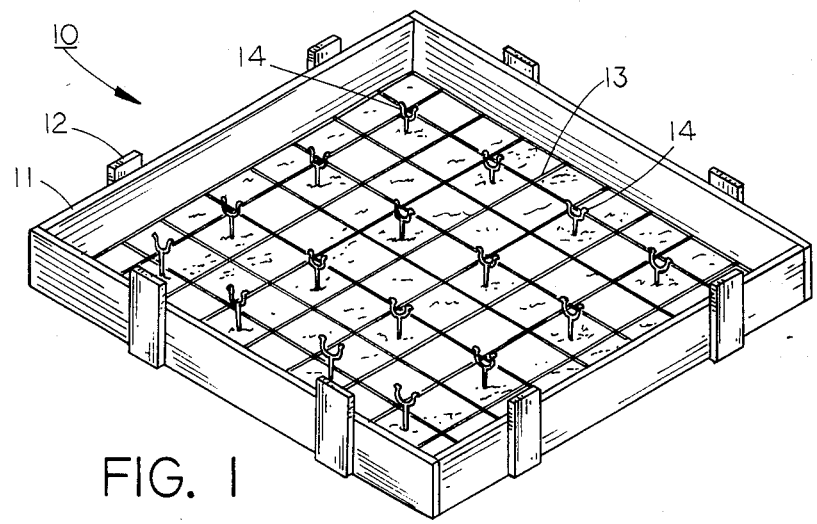
FIG. 1 comprises a perspective view of the apparatus.
Figure 5:
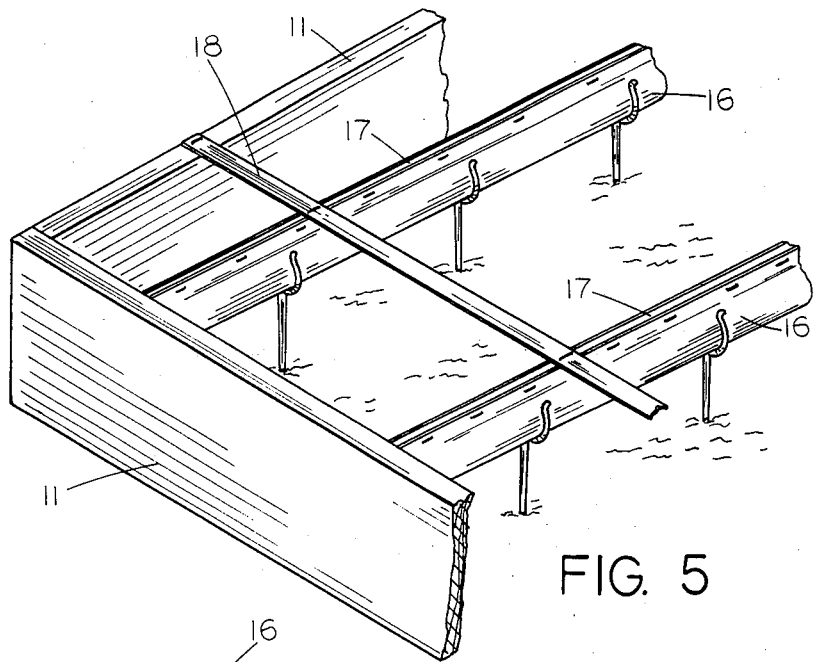
FIG. 5 comprises a perspective enlarged detail view of the apparatus depicting the strap member.

Referring now to the drawings, and in particular to FIG. 1, the apparatus of the invention can be seen as depicted generally by the numeral 10. The apparatus (10) includes generally boundary forms (11), support stakes (12), a reinforcement frame (13), a plurality of high chair units (14), a plurality of fiberglass molds (16) (FIG. 3), a plurality of spacers (1) (FIG. 2), and a plurality of strap members (18) (FIG. 5). These components will now be described in more detail in seriatim fashion.

The boundary forms (11) (FIG. 1) may be comprised of wood or the like as is well known in the prior art. The boundary forms (11) are positioned to form the outer boundaries of the finished poured concrete floor. To facilitate easier removal of the boundary forms (11) when the floor has cured, the interior surfaces of the boundary forms (11) may be coated with form oil, also as is well known in the art.

The boundary forms (11) may be held in place through use of support stakes (12). The support stakes may be comprised of wood, steel or any other suitable material such that the stakes (12) can be driven into the ground and are of adequate strength to retain the boundary forms (11) in their respective positions when the concrete has been poured.

The reinforcement frame (13) can also be of any type reinforcement means known in the prior art. In the embodiment depicted, the reinforcement frame (13) has been provided through use of a steel mesh. The purpose of the reinforcement frame (13) is to provide added structural support to the concrete floor.

Figure 4:
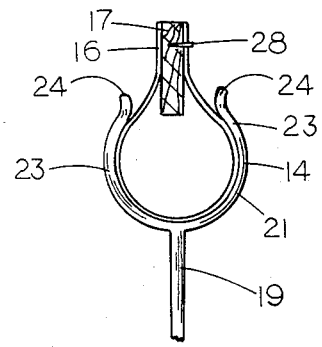
FIG. 4 comprises an enlarged front elevational view of the apparatus.
Figure 3:
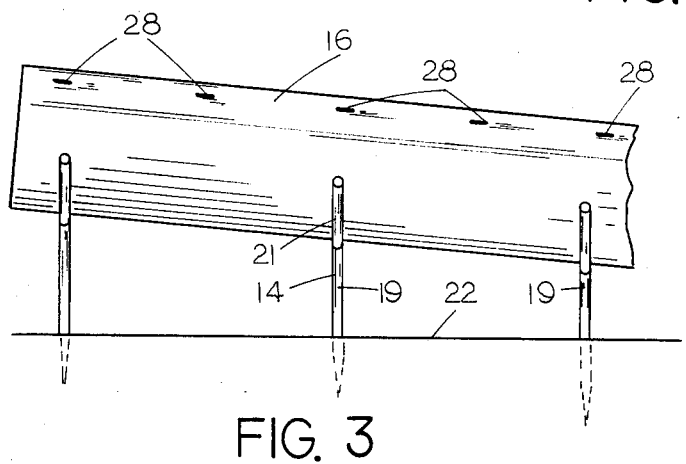
FIG. 3 comprises a side elevational enlarged view of the apparatus.

Referring to FIGS. 3 and 4, the high chair units (14) will now be described. Each high chair unit (14) has a support member (19) and a mold fitting member (21).

The support member (19) may be comprised of an elongated stake that may be tapered at one end to facilitate disposing the support member (19) into the ground (22). The support member may be comprised of number one rebar material or other suitable material.

The mold fitting member (21) affixes to the support member and has two curved arms (23) that curve arcuately upward and that each have tapered end pieces (24). The arcuate arms (23) of the mold fitting member (21) serve to support the fiberglass mold (16) and also to urge it towards a particular cross sectional configuration as described in more detail below.

Figure 2:
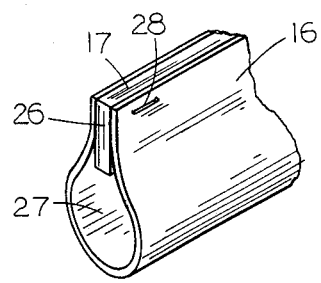
FIG. 2 comprises an enlarged perspective view of a section of the fiberglass mold.

Referring to FIGS. 2 and 3, each fiberglass mold (16) may be comprised of 3/16" (0.476 cm.) thick fiberglass sheet that has been smoothly folded back upon itself to form a truncated substantially teardrop-shaped cross section. Because of this configuration, each fiberglass mold (16) has a first upper narrow cavity (26) and a second lower wide cavity (27).

With continued reference to FIGS. 2 and 3, and also to FIG. 4, the spacer (17) may be comprised of a thin wooden lathe or the like that may be fit within the narrow first cavity (26) of the fiberglass mold (16) and that may be fastened in place through use of staples (28) or the like. As depicted in FIG. 4, the spacer (17) aids in urging the upper ends of the fiberglass mold (16) apart to preserve the formation of the narrow first cavity (26) therebetween. The importance of this will be made more clear below.

Finally, referring to FIG. 5, the strap member (18) will be described. The strap may be provided through use of thirty gauge banding or the like that may be attached by use of staples or the like to the boundary forms (11) and to each spacer (17). The strap members (18) may be disposed substantially parallel to one another and at approximate eight foot (2.44 meter) intervals.

The apparatus (10) now having been described, the method of using the apparatus (10) to form a concrete flush floor having integrally formed troughs will now be described.

Once the proposed site has been chosen, it must be graded and otherwise surveyed to assure correct size, position and orientation. The boundary forms (11) (FIG. 1) may then be positioned to mark the periphery of the floor to be. The boundary forms (11) can then be secured in place by use of the support stakes (12).

Following the addition of an appropriate quantity of foundation material, such as sand, in accordance with known prior art practices, the reinforcement frame (13) may be disposed within the confines of the boundary forms (11).

Following this, the high chair units (14) are placed in aligned groups, such that in each group, a plurality of high chair units (14) are co-linearly disposed, with each co-linearly disposed group of high chair units (14) being disposed substantially parallel to the other groups. The high chair units (14) are each disposed and supported by placing the support member (19) in contact with the ground (22) and forcing the support member (19) into the ground.

Through use of a laser transit or other known means, the high chair units (14) are each placed into the ground to a desired height, so that a fiberglass mold (16) supported by any aligned group of high chair units (14) will be disposed at a desired slope.

The spacers (17) are then disposed within the narrow first cavity (26) provided in each fiberglass mold (16). The spacers (17) are then fastened in place through use of staples (28) or the like. The fiberglass molds (16) may then be disposed through and supported by the mold fitting members (21) of the high chair units (14). As shown in FIG. 3, each fiberglass mold (16) will be supported at a desired angle above the ground (22). The upper edge of the fiberglass mold (16) should essentially coincide with the desired surface height of the floor to be.

Referring to FIG. 4, it can be seen that the arcuate arms (23) of the mold fitting member (21) serve to not only hold and support the fiberglass mold (16) but to also urge the upper ends of the fiberglass mold (16) towards one another. The spacer (17) prevents the ends from moving towards one another at this point in the process.

Referring to FIG. 5, the strap member (18) may be disposed across the top of the assembled structure in a line substantially perpendicular to the orientation of the fiberglass molds (16). The strap members (18) may be disposed as desired, though generally will be disposed substantially parallel to one another and at approximate eight foot (2.44 meter) intervals. The strap member (18) may be secured in place by stapling it to both the boundary forms (11) and the spacers (17) of each fiberglass mold (16). So configured, the strap member (18) will aid in preventing vertical movement of either the fiberglass molds (16) or the spacers (17) when the concrete is being poured.

Following this, the concrete can be poured and evenly dispersed between the boundary forms (11). At some point during the curing process, the strap members (18) may be removed and the surface of the floor given its final finish to obscure any marks that the strap members (18) may have made in the surface.

Figure 6:
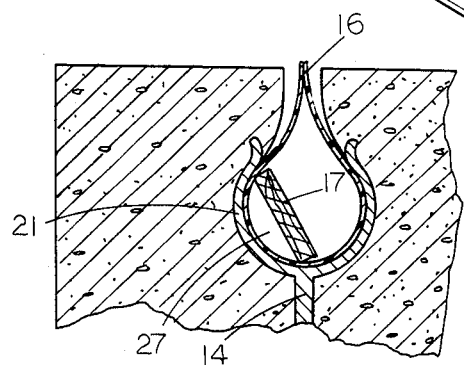
FIG. 6 comprises a front elevational enlarged sectioned view of the poured concrete with the fiberglass mold in place.

Referring to FIG. 6, when the concrete has firmly set, the spacers (17) can be tapped down into the interior second cavity (27) of the molds (16) by use of any number of known tools. When so disposed, the upper ends of the fiberglass mold (16) are urged towards one another through both their own inherent resiliency and the forces exerted thereon by the mold fitting member (21).

Figure 7:
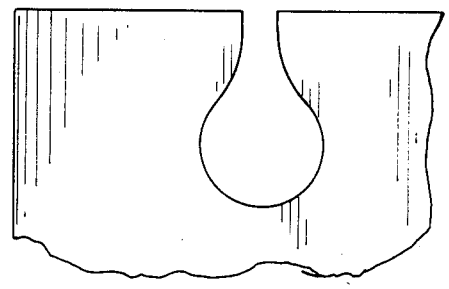
FIG. 7 comprises a front elevational enlarged detail view of the concrete flush floor having an integral trough formed therein.

With the boundary forms (11) removed, each of the fiberglass molds (16) can be removed by simply sliding them out of the troughs formed thereby in the concrete. With reference to FIG. 7, a well formed inclined trough will remain in the concrete. So configured, the flush floor may then be used for its intended purpose.

Through use of this apparatus and method, a flush floor having one or more sloping integral troughs formed therein can be simply and reliably formed, and without incurring great expense. The resulting floor will be at least as durable as any prior art floors and is well suited to meet its intended needs.

Obviously, numerous modifications and variations of the present invention are possible in light of the above teachings. It is therefore to be understood that, within the scope of the appended claims, the invention may be practised otherwise than as specifically described therein.

I claim:

1. A method of forming a concrete flush floor having at least one trough integrally formed therein, the method comprising the steps of:
    (a) substantially colinearly disposing in an area where said floor is to be formed a plurality of high chair units for each said trough, each high chair unit having a support member and a mold fitting member operably supported by said support member;
    (b) disposing a substantially resilient trough mold through each said mold fitting member;
    (c) disposing concrete about said trough mold in said area to form said floor;
    (d) allowing said concrete to harden; and
    (e) removing said trough molds from said concrete by sliding said trough molds out of said integrally formed troughs.

2. The method of claim 1 wherein said method further includes the steps of:
    (a) disposing a spacer in an operative position in said trough mold prior to disposing said concrete about said trough mold to urge at least a portion of said trough mold towards a first position; and
    (b) removing said spacer from said operative position once said concrete has hardened, such that said portion of said trough mold will assume a second position that makes it easier to remove said trough mold from said concrete.

3. The method of claim 2 wherein said method further includes the step of adding at least one strap member that operably affixes to said spacers prior to disposing said concrete to prevent vertical movement of said spacers and said trough molds during disposition of said concrete about said trough molds.

4. The method of claim 2 wherein said step of removing said spacers is accomplished by forcing said spacers into an interior cavity of said trough molds.

5. The method of claim 2 wherein said method further includes the step of disposing said high chair units at various heights so that said trough mold will be disposed at a preselected sloping angle.

* * * * *